B. F. ROBERTS.
TRENCH FILLER.
APPLICATION FILED JUNE 12, 1912.
1,152,049.
Patented Aug. 31, 1915.
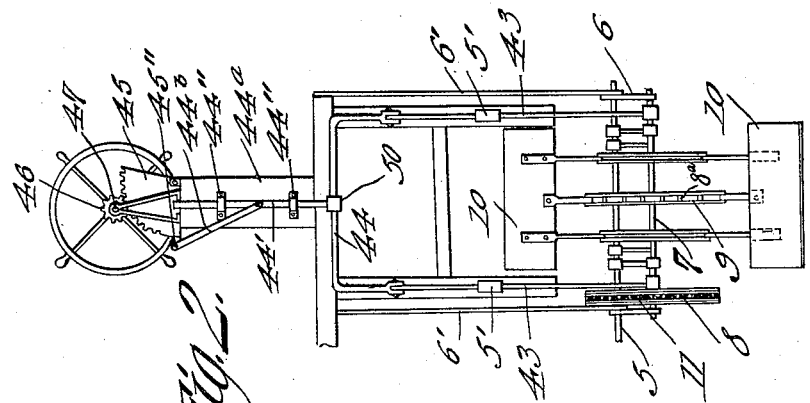
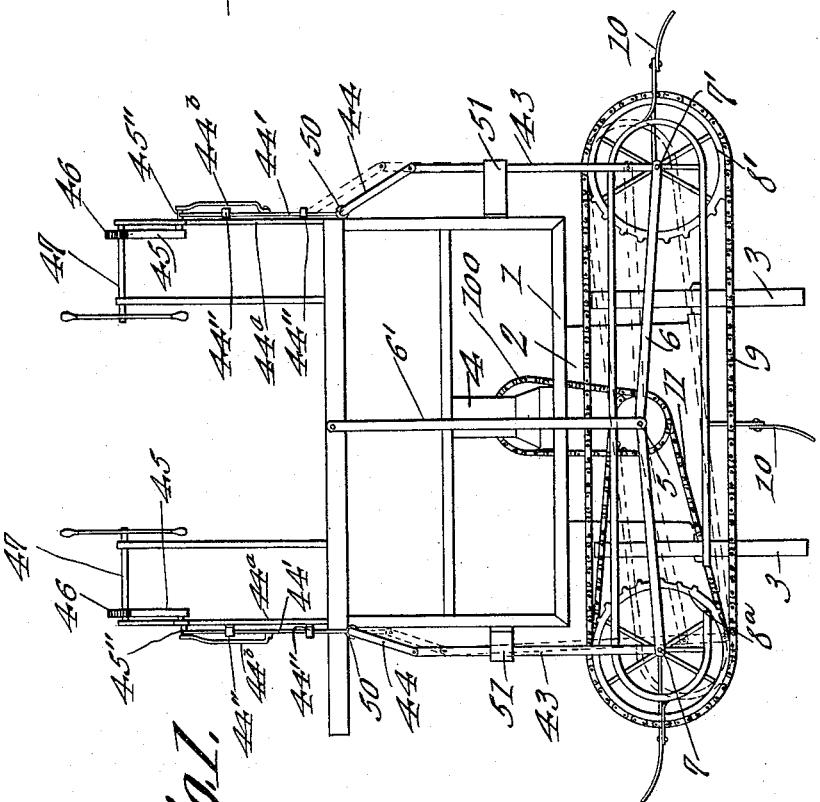

UNITED STATES PATENT OFFICE.

BENJAMIN F. ROBERTS, OF MACON, GEORGIA.

TRENCH-FILLER.

1,152,049.  Specification of Letters Patent.  Patented Aug. 31, 1915.

Application filed June 12, 1912. Serial No. 703,334.

*To all whom it may concern:*

Be it known that I, BENJAMIN F. ROBERTS, a citizen of the United States, residing at Macon, in the county of Bibb and State of Georgia, have invented a new and useful Trench-Filler, of which the following is a specification.

The present invention relates to improvements in a trench filler, one object of the present invention being the provision of a conveyer mechanism supported by the frame of the machine intermediate of its ends so that the same may be swung to be raised or lowered at either end or to be placed in a horizontal plane, there being provided means for adjusting the same and for supporting the same in such adjusted position.

A further object of the present invention is the provision of a trench filler provided with an endless conveyer frame supported intermediate of its ends and having a manually controlled means for changing its position.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a front view of the present machine showing the conveyer mechanism in horizontal position, dotted lines illustrating one extreme tilted position thereof. Fig. 2 is an end view looking toward the left hand end of Fig. 1.

Referring to the drawings, the numeral 1 designates the super-structure or frame, which is provided with the wheel carrying standard 2, to which are connected the wheels 3 whereby the present device is made portable.

An explosion engine or prime mover 4 is mounted in the frame 1 and transmits power through the medium of the sprocket chain 100 to the shaft 5 which in turn transmits motion to the sprocket 8 mounted upon the shaft 7 by means of the sprocket chain 11. The sprocket 8ª has trained thereover the endless chain 9, which transmits motion to the alined sprocket 8' which is disposed at the opposite end of the conveyer frame 6 in which the shafts 7 and 7' carrying the respective sprockets 8 and 8' are journaled. As the sprockets 8 and 8ª are both on the shaft 7, the sprocket 8 drives the sprocket 8ª, and through the chain 9, the sprocket 8'. The frame 6 is supported intermediate of its ends for pivotal movement by means of the two vertical rods or braces 6', which are connected to and supported from the frame 1.

Attached to and carried by the conveyer chain 9 are a plurality of scraper blades 10.

The frame 6 is pivoted to the lower ends of the braces 6', so that the frame may be swung to the full and dotted line positions as shown in Fig. 1.

In order to provide a means for raising and lowering the respective ends of the conveyer and maintaining the same at the desired adjustment, there are slidably mounted at opposite ends of the frame 1, the two vertical rods 43, which are guided in the members 51 carried by the frame 1, the lower ends of said rods being connected at their outer ends to the shafts 7 and 7'. These rods 43 are arranged in pairs, the upper ends of the same being hingedly connected to the downwardly depending arms of the substantially U-shaped member 44, which is fixedly connected intermediate of its ends at 50 to the vertically slidable rod 44'. Each rod 44', there being two to each conveyer mechanism, is mounted slidably in the straps 44'' carried upon the face of the supporting member 44ª, which in turn is carried by the frame 1.

Journaled upon the upper end of the support 44ª for swinging movement, is a toothed segment 45, which is provided with the projection 45'', to which the link 44ᵇ is connected at one end, the opposite end of the link 44ᵇ being connected to the rod 44' at a point for movement between the straps 44''. Thus as the segment 45 is rocked, the member 44 is raised or lowered to cause the conveyer to assume the full or dotted line positions as illustrated in Fig. 1 to thus cause the conveyer mechanism to assume a horizontal or inclined position at either side of the frame as may be desired.

In order to operate each segment 45, a pinion 46 is carried upon the manually controlled shaft 47, and such pinion 46 is in mesh at all times with its respective segment 45.

It will thus be seen that by rotating one of the manually controlled shafts 47 in one direction while rotating the other in the opposite direction, that the respective ends of the conveyer frame will be moved in opposite directions so that the conveyer will be moved from its horizontal position which is the normal traveling position thereof, to either one of the inclined positions one of which is clearly shown in dotted lines in Fig. 1.

What is claimed is:—

In a trench filler, the combination with a supporting frame and a conveyer frame mounted intermediate of its ends for swinging movement, of means for adjusting the conveyer frame to the desired angularity, comprising two pairs of vertically movable rods, one pair attached to each end of the conveyer frame and mounted for sliding movement in the supporting frame, a coupling member connected to the upper end of each rod of each pair, a vertically slidable rod attached to each coupling member and guided in the supporting structure, a link connected to said last rod, an arm connected to the upper end of the said link, a toothed segment carrying said arm and mounted for rocking movement, a manually operated shaft mounted in the supporting structure, and a pinion fixed upon the last shaft and in engagement with the toothed segment, whereby the movement of the segment will adjust its respective end of the conveyer frame.

In testimony that I claim the foregoing as my own, I have hereto affixed my signature in the presence of two witnesses.

BENJAMIN F. ROBERTS.

Witnesses:
J. M. COCHRAN,
J. W. BIRCHFIELD.

Copies of this patent may be obtained for five cents each, by addressing the "Commissioner of Patents, Washington, D. C."